(12) United States Patent
Tsou et al.

(10) Patent No.: US 10,700,595 B2
(45) Date of Patent: Jun. 30, 2020

(54) CONTROLLER FOR EXTENDING A PROTECTION PERIOD OF A POWER CONVERTER AND OPERATIONAL METHOD THEREOF

(71) Applicant: Leadtrend Technology Corp., Hsinchu (TW)

(72) Inventors: Ming-Chang Tsou, Hsinchu (TW); Chih-Pu Yeh, Hsinchu (TW); Ru-Hung Lu, Hsinchu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/435,544

(22) Filed: Jun. 9, 2019

(65) Prior Publication Data
US 2019/0386559 A1 Dec. 19, 2019

Related U.S. Application Data

(60) Provisional application No. 62/686,691, filed on Jun. 19, 2018.

(30) Foreign Application Priority Data

Apr. 2, 2019 (TW) .............................. 108111624 A

(51) Int. Cl.
*H02M 1/32* (2007.01)
*H02M 3/335* (2006.01)
*H02M 1/00* (2006.01)

(52) U.S. Cl.
CPC .......... *H02M 1/32* (2013.01); *H02M 3/33576* (2013.01); *H02M 2001/0009* (2013.01); *H02M 2001/322* (2013.01)

(58) Field of Classification Search
CPC ............. H02M 1/32; H02M 2001/322; H02M 2001/0009
See application file for complete search history.

(56) References Cited

U.S. PATENT DOCUMENTS

| 6,185,082 B1* | 2/2001 | Yang | H02M 1/32 |
| | | | 323/285 |
| 7,149,098 B1* | 12/2006 | Chen | H02M 1/32 |
| | | | 363/56.09 |
| 2019/0181634 A1* | 6/2019 | Saji | H02H 1/0007 |

FOREIGN PATENT DOCUMENTS

TW 201023469 6/2010

* cited by examiner

*Primary Examiner* — Alex Torres-Rivera
(74) *Attorney, Agent, or Firm* — Winston Hsu

(57) ABSTRACT

A controller for extending a protection period of a power converter includes a delay circuit. The delay circuit is coupled to a supply voltage pin of the controller. When the power converter enters a protection mode, the delay circuit is enabled, receives a supply voltage through the supply voltage pin, and extends a protection period corresponding to the protection mode according to the supply voltage.

17 Claims, 8 Drawing Sheets

CONTROLLER FOR EXTENDING A PROTECTION PERIOD OF A POWER CONVERTER AND OPERATIONAL METHOD THEREOF

CROSS REFERENCE TO RELATED APPLICATIONS

This application claims the benefit of U.S. Provisional Application No. 62/686,691, filed on Jun. 19, 2018 and entitled "Novel IC protection pause status in Flyback Controller," the contents of which are incorporated herein by reference.

BACKGROUND OF THE INVENTION

1. Field of the Invention

The present invention relates to a controller applied to a power converter and an operational method thereof, and particularly to a controller and an operational method thereof that can extend a protection period of the power converter.

2. Description of the Prior Art

In the prior art, when a power converter is applied to a television and enters a protection mode (wherein the protection mode corresponds to output short-circuited protection (OSCP) or over current protection (OCP)), because the television cannot be turned off arbitrarily, a gate signal generation circuit of a controller applied to the power converter can generate a gate control signal similar to a burst mode to a power switch of a primary side of the power converter. That is to say, during an enabling time of the gate control signal (corresponding to a recovery period of the protection mode), operation of the power switch still generates heat. If during a disabling time of the gate control signal (corresponding to a protection period of the protection mode), the heat generated by the power switch during the recovery period cannot be effectively dissipated, the heat generated by the power switch during the recovery period may damage components within the television. Therefore, how to effectively dissipate the heat generated by the power switch during the recovery period becomes an important issue.

SUMMARY OF THE INVENTION

An embodiment of the present invention provides a controller for extending a protection period of a power converter. The controller includes a delay circuit. The delay circuit is coupled to a supply voltage pin of the controller, wherein when the power converter enters a protection mode, the delay circuit is enabled, receives a supply voltage through the supply voltage pin, and extends the protection period corresponding to the protection mode according to the supply voltage.

Another embodiment of the present invention provides an operational method of a controller extending a protection period of a power converter, wherein the controller includes a delay circuit, and the delay circuit includes a first current source, a delayer, and a second current source. The operational method includes the power converter entering a protection mode; the first current source generating a first discharge current according to a protection signal corresponding to the protection mode and a supply voltage, and the supply voltage being determined by the first discharge current, a capacitor of a primary side of the power converter, and a charge current corresponding to an input terminal of the primary side of the power converter; the delayer generating a delay enabling signal according to the protection signal and a detection voltage of the primary side of the power converter, wherein the delay enabling signal corresponds to a predetermined delay time; and the second current source generating a second discharge current according to the delay enabling signal, and the supply voltage being determined by the second discharge current, and the first discharge current, the capacitor, and the charge current.

Another embodiment of the present invention provides an operational method of a controller extending a protection period of a power converter, wherein the controller includes a delay circuit, and the delay circuit includes a current source and a counter. The operational method includes the power converter entering a protection mode; the current source being enabled according to a protection signal corresponding to the protection mode; the current source generating a first discharge current when a supply voltage is less than a lower limit, and the supply voltage being determined by the first discharge current, a capacitor of a primary side of the power converter, and a charge current corresponding to an input terminal of the primary side of the power converter; the current source generating a second discharge current when the supply voltage is greater than an upper limit, and the supply voltage being determined by the second discharge current, the capacitor, and the charge current; and the counter making the current source generate the second discharge current when a number of the supply voltage being less than the lower limit counted by the counter is equal to a predetermined number; wherein the first discharge current is less than the charge current, and the second discharge current is greater than the charge current.

The present invention provides a controller for extending a protection period of a power converter and an operational method thereof. The controller and the operational method utilize a delay circuit to extend the protection period corresponding to a protection mode according to a supply voltage after the power converter enters the protection mode. Therefore, because the present invention can extend the protection period, compared to the prior art, the present invention can make heat generated by a power switch of the power converter during a recovery period corresponding to the protection mode be effectively dissipated. In addition, because the controller controls the supply voltage directly through a supply voltage pin, the controller does not need any additional pin.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
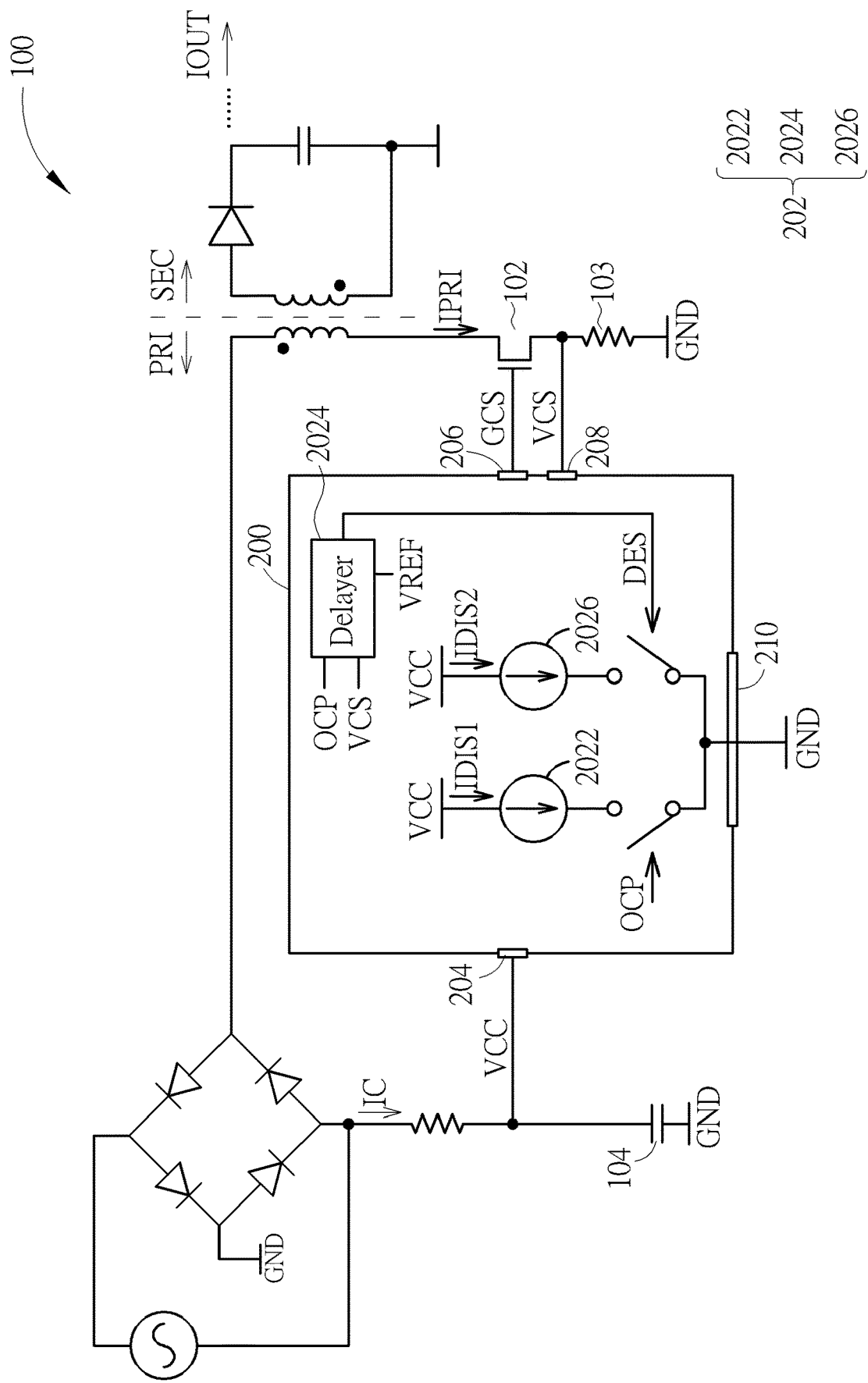
FIG. 1 is a diagram illustrating a controller for extending a protection period of a power converter according to a first embodiment of the present invention.

Please refer to FIG. 1. FIG. 1 is a diagram illustrating a controller 200 for extending a protection period of a power converter 100 according to a first embodiment of the present invention, wherein the power converter 100 is a flyback power converter, and FIG. 1 only shows components of the power converter 100 and the controller 200 related to the present invention to simplify FIG. 1. As shown in FIG. 1, the controller 200 includes a delay circuit 202, and the delay circuit 202 includes a first current source 2022, a delayer 2024, and a second current source 2026, wherein the first current source 2022 is coupled to a supply voltage pin 204, the second current source 2026 is coupled to the delayer 2024 and the supply voltage pin 204, and the controller 200 receives a supply voltage VCC through the supply voltage pin 204. As shown in FIG. 1, a protection circuit (not shown in the controller 200 of FIG. 1) of the controller 200 can determine whether to make the power converter 100 enter a protection mode according to an output current IOUT of a secondary side SEC of the power converter 100, wherein the protection mode corresponds to output short-circuited protection (OSCP) or over current protection (OCP). In addition, it is well-known to one of ordinary skill in the art that a method of the protection circuit determining whether to make the power converter 100 enter the protection mode according to the output current IOUT, so further description thereof is omitted for simplicity.

Figure 2:
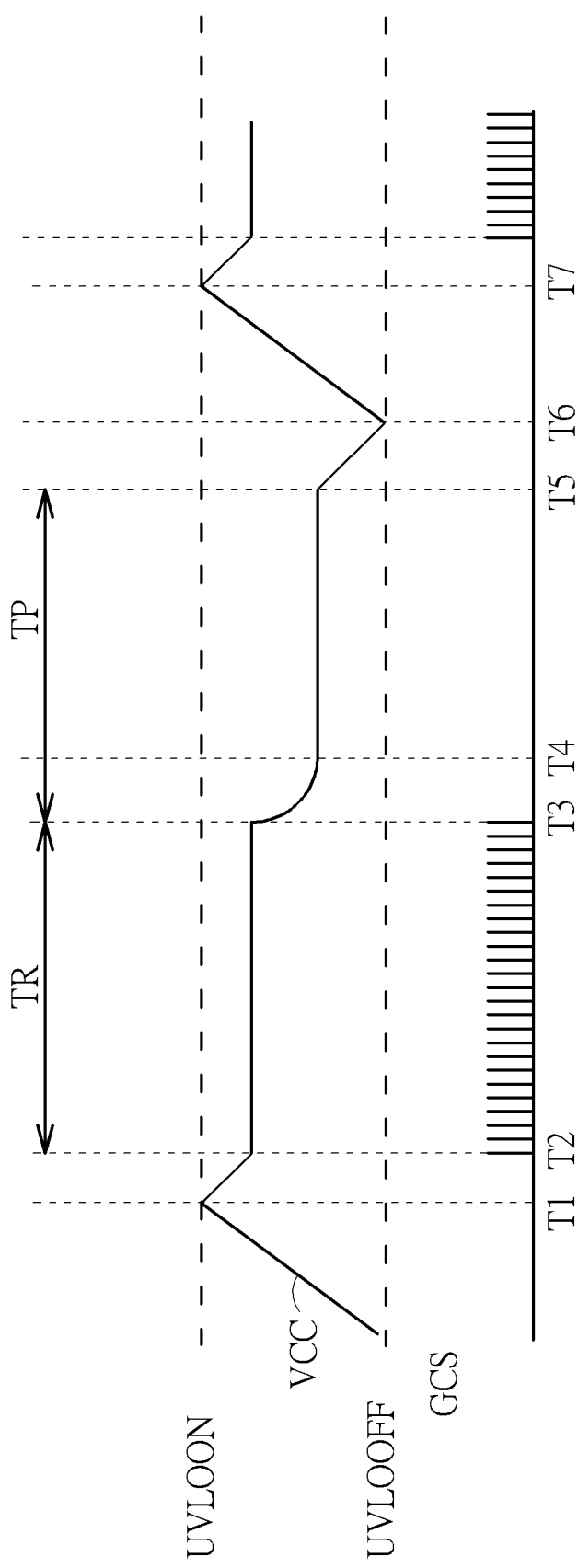
FIG. 2 is a timing diagram illustrating the supply voltage of the controller and a gate control signal generated by the controller after the power converter enters the protection mode.

Please refer to FIG. 2. FIG. 2 is a timing diagram illustrating the supply voltage VCC of the controller 200 and a gate control signal GCS generated by the controller 200 after the power converter 100 enters the protection mode. As shown in FIG. 2, at a time T1, because the supply voltage VCC is greater than an under voltage lock out turning-on voltage UVLOON, a gate signal generation circuit (not shown in the controller 200 of FIG. 1) of the controller 200 will generate the gate control signal GCS to a power switch 102 of a primary side PRI of the power converter 100 between a time T2 and a time T3, wherein the gate control signal GCS is a pulse width modulation (PWM) signal, the gate control signal GCS is transmitted to the power switch 102 through a pin 206 of the controller 200, and an time interval between the time T2 and the time T3 is a recovery period TR of the power converter 100 corresponding to the protection mode. As shown in FIG. 2, at the time T3, the gate signal generation circuit of the controller 200 can stop generating the gate control signal GCS to the power switch 102 according to a detection voltage VCS (as shown in FIG. 1) of the primary side PRI of the power converter 100 and a reference voltage VREF, and the protection circuit generates a protection signal OCP to the first current source 2022 and the delayer 2024, wherein the detection voltage VCS is determined by a primary-side current IPRI flowing through the primary side PRI of the power converter 100 and a resistor 103, and the controller 200 receives the detection voltage VCS through a pin 208. Therefore, because the protection circuit generates the protection signal OCP to the first current source 2022, the first current source 2022 is enabled and starts to generate a first discharge current IDIS1 according to the supply voltage VCC to discharge a capacitor 104 (as shown in FIG. 1), wherein the first discharge current IDIS1 is changed with variation of the supply voltage VCC, and the first discharge current IDIS1 flows through a pin 210 of the controller 200 to ground GND. As shown in FIGS. 1, 2, during the recovery period TR, because only a charge current IC charges the capacitor 104, meanwhile the supply voltage VCC is determined by the charge current IC and the capacitor 104, resulting in the supply voltage VCC being maintained at a first steady state. After the time T3, the first discharge current IDIS1 starts to discharge the capacitor 104, so the supply voltage VCC is determined by the first discharge current IDIS1, the charge current IC, and the capacitor 104, wherein in one embodiment of the present invention, the first discharge current IDIS1 is greater than the charge current IC at the time T3, so the supply voltage VCC will start to be gradually reduced until a time T4 (because the first discharge current IDIS1 is changed with the variation of the supply voltage VCC, at the time T4, the first discharge current IDIS1 will be reduced to be equal to the charge current IC, resulting in after the time T4, the supply voltage VCC being maintained at a second steady state until a time T5).

As shown in FIG. 2, at the time T5, the delayer 2024 can generate a delay enabling signal DES to the second current source 2026 according to the protection signal OCP and the detection voltage VCS, so the second current source 2026 is enabled and starts to generate a second discharge current IDIS2 to discharge the capacitor 104, wherein the delay enabling signal DES corresponds to a predetermined delay time, an time interval between the time T3 and the time T5 is a protection period TP of the power converter 100 corresponding to the protection mode, and the second discharge current IDIS2 flows through the pin 210 of the controller 200 to the ground GND. As shown in FIG. 2, after the time T5, the second discharge current IDIS2 starts to discharge the capacitor 104 (wherein the first discharge current IDIS1 still continuously discharges the capacitor 104, so the supply voltage VCC is determined by the first discharge current IDIS1, the second discharge current IDIS2, the charge current IC, and the capacitor 104), resulting in after the time T5, the supply voltage VCC starting to be reduced from the second steady state until less than an under voltage lock out turning-off voltage UVLOOFF (a time T6 shown in FIG. 2). As shown in FIG. 2, at the time T6, because the supply voltage VCC is lower than the under voltage lock out turning-off voltage UVLOOFF, the controller 200 disables the delay circuit 2024, resulting in the supply voltage VCC starting to be gradually increased until greater than the under voltage lock out turning-on voltage UVLOON (a time T7 shown in FIG. 2). As shown in FIG. 2, after the time T7, the controller 200 will execute the above-mentioned operational principles of the time T1 to the time T7 repeatedly until the power converter 100 leaves the protection mode. In addition, in another embodiment of the present invention, the second discharge current IDIS2 can be adjusted according to an output voltage (wherein the output voltage is not shown in FIG. 1) of the secondary side SEC of the power converter 100. For example, when the output voltage is high, the second discharge current IDIS2 is lower, and when the output voltage is low, the second discharge current IDIS2 is higher.

Figure 3:
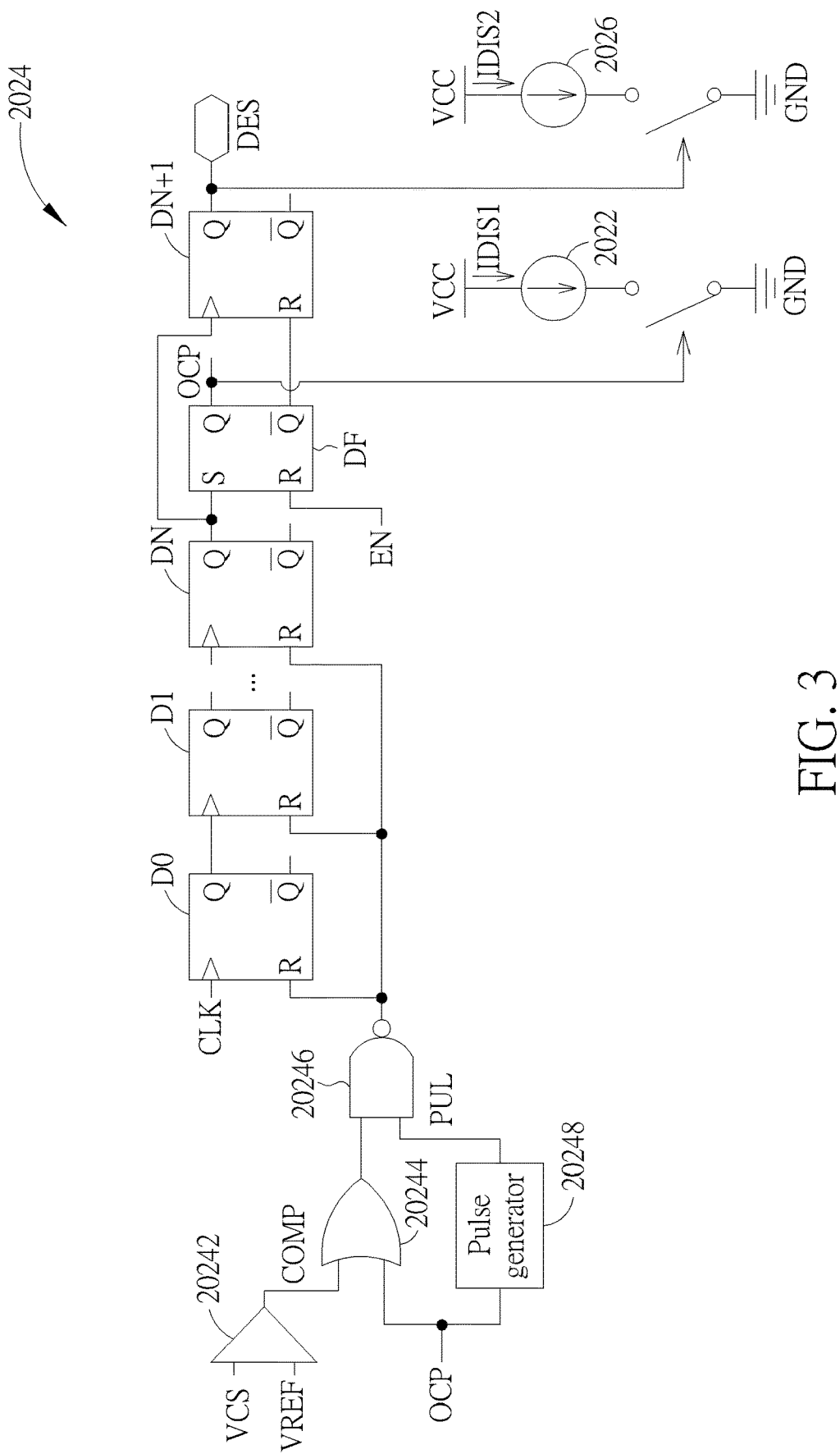
FIG. 3 is a diagram illustrating coupling relationships between the first current source, the delayer, and the second current source.
Figure 4:
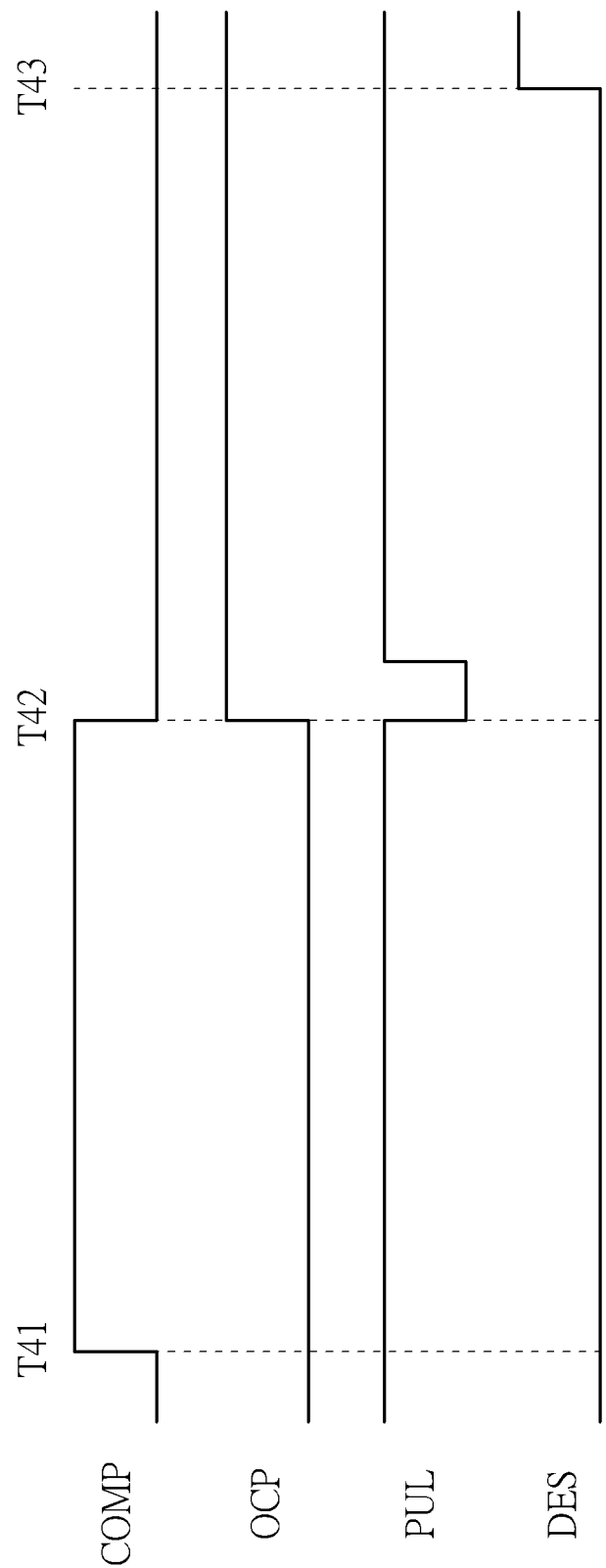
FIG. 4 is a diagram illustrating an operating timing of the delayer.

Please refer to FIGS. 3, 4. FIG. 3 is a diagram illustrating coupling relationships between the first current source 2022, the delayer 2024, and the second current source 2026, and FIG. 4 is a diagram illustrating an operating timing of the delayer 2024. As shown in FIG. 3, the delayer 2024 includes a comparator 20242, an OR gate 20244, a NAND gate 20246, a pulse generator 20248, and flip-flops D0-DN+1, DF. As shown in FIGS. 2, 3, 4, between a time T41 (corresponding to the time T2 of FIG. 2) and a time T42 (corresponding to the time T3 of FIG. 2), because the gate signal generation circuit generates the gate control signal GCS to the power switch 102, the detection voltage VCS is gradually increased from zero until the detection voltage VCS is equal to the reference voltage VREF at the time T3. Therefore, between the time T41 and the time T42, a comparison signal VCOMP generated by the comparator 20242 is high. In addition, between the time T41 and the time T42, the protection circuit does not generate the protection signal OCP yet, so the protection signal OCP is low. In addition, as shown in FIG. 4, after the time T42, the comparison signal VCOMP, the protection signal OCP, and a pulse signal PUL generated by the pulse generator 20248 can make reset pins R of the flip-flops D0-DN+1 be low, so the delayer 2024 can utilize the flip-flops D0-DN+1 to delay a clock signal CLK, and generate the delay enabling signal DES to the second current source 2026 at a time T43 (corresponding to the time T5 of FIG. 2), resulting in the second current source 2026 being enabled and starting to generate the second discharge current IDIS2 to discharge the capacitor 104, wherein as shown in FIG. 4, a chain composed of the flip-flops D0-DN+1 is used for determining the predetermined delay time. That is to say, the delayer 2024 can utilize the flip-flops D0-DN+1 to change length of the predetermined delay time. In addition, the pulse generator 20248 generates the pulse signal PUL according to a rising edge of the protection signal OCP. In addition, as shown in FIG. 4, after the time T42, a reset signal EN of the flip-flop DF is low to maintain the protection signal OCP high.

In one embodiment of the present invention, when the power converter 100 is applied to a television and enters the protection mode, because the television cannot be turned off arbitrarily, the controller 200 can operate according to the timing shown in FIG. 2. Although as shown in FIG. 2, the gate signal generation circuit can still generate the gate control signal GCS to the power switch 102 during the recovery period TR, because the delayer 2024 can utilize the flip-flops D0-DN+1 to extend the predetermined delay time (that is, extending the protection period TP, wherein during the protection period TP, the gate signal generation circuit stops generating the gate control signal GCS to the power switch 102), the controller 200 can make heat generated by the power switch 102 of the power converter 100 during the recovery period TR be effectively dissipated to protect components within the television. In addition, because the controller 200 utilizes the delay circuit 202 to control the supply voltage VCC directly through the supply voltage pin 204, the controller 200 is still a 6-pin integrated circuit. That is to say, the present invention can make the controller 200 not need any additional pin.

Figure 5:
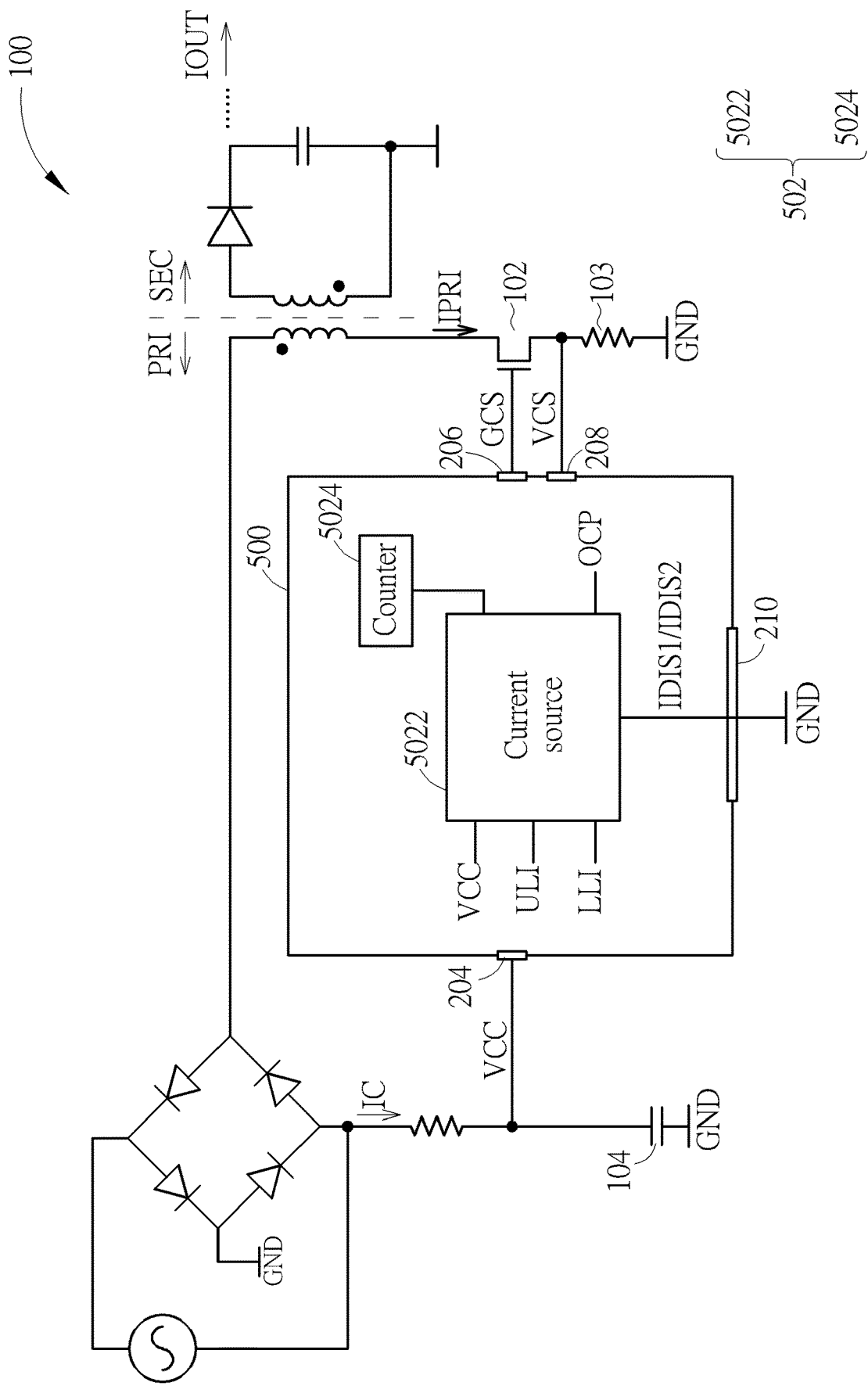
FIG. 5 is a diagram illustrating a controller for extending the protection period of the power converter according to a second embodiment of the present invention.
Figure 6:
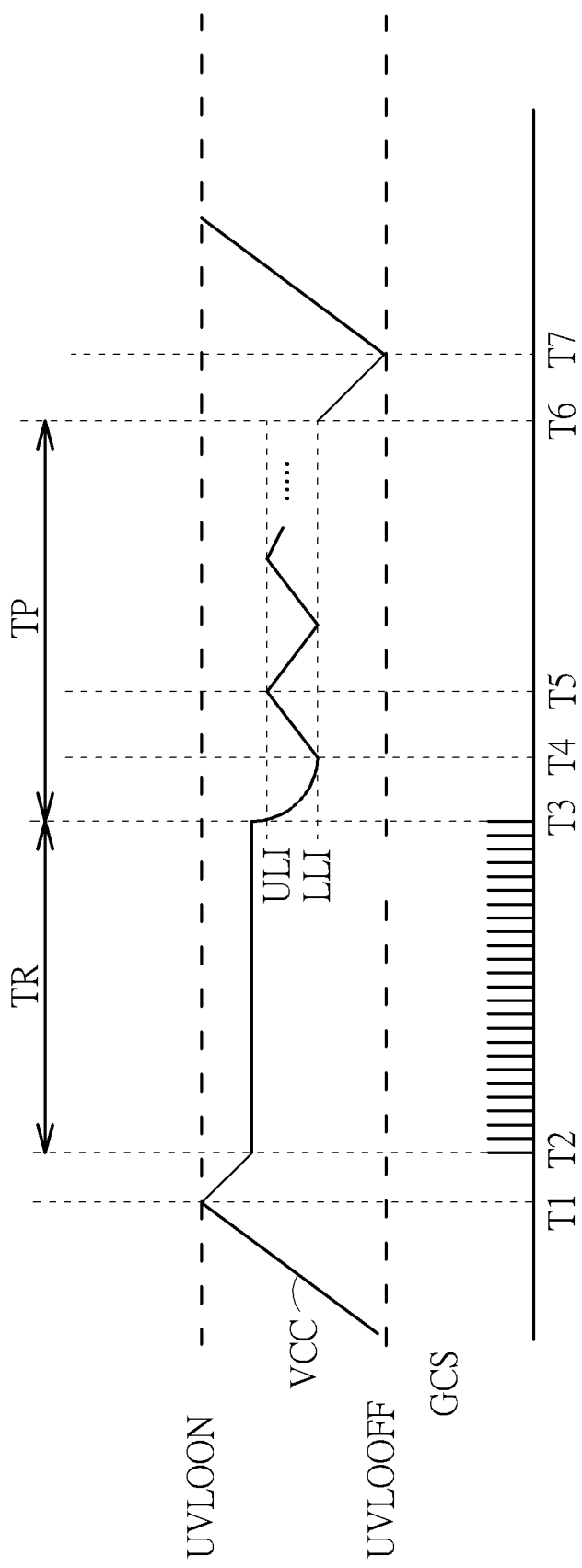
FIG. 6 is a timing diagram illustrating a supply voltage of the controller and a gate control signal generated by the controller after the power converter enters the protection mode.

Please refer to FIGS. 5, 6. FIG. 5 is a diagram illustrating a controller 500 for extending the protection period of the power converter 100 according to a second embodiment of the present invention, and FIG. 6 is a timing diagram illustrating a supply voltage VCC of the controller 500 and a gate control signal GCS generated by the controller 500 after the power converter 100 enters the protection mode, wherein FIG. 5 only shows components of the power converter 100 and the controller 500 related to the present invention to simplify FIG. 5. As shown in FIG. 5, differences between the controller 500 and the controller 200 are that the controller 500 includes a delay circuit 502, and the delay circuit 502 includes a current source 5022 and a counter 5024, wherein the current source 5022 is coupled to the supply voltage pin 204, the counter 5024 is coupled to the current source 5022, and the controller 500 receives the supply voltage VCC through the supply voltage pin 204. In addition, as shown in FIG. 6, a difference between the supply voltage VCC of the controller 500 and the supply voltage VCC of the controller 200 is operational principles corresponding to the protection period TP, and detailed descriptions are as follows.

As shown in FIG. 6, after the power converter 100 enters the protection mode, at a time T3, a gate signal generation circuit (not shown in the controller 500 of FIG. 5) of the controller 500 can stop generating the gate control signal GCS to the power switch 102 according to a detection voltage VCS (as shown in FIG. 5) of the primary side PRI of the power converter 100 and the reference voltage VREF, and a protection circuit (not shown in the controller 500 of FIG. 5) of the controller 500 generates the protection signal OCP to the current source 5022. Therefore, because the protection circuit of the controller 500 generates the protection signal OCP to the current source 5022, the current source 5022 is enabled and starts to generate a second discharge current IDIS2 to discharge the capacitor 104 (as shown in FIG. 5). After the time T3, because the second discharge current IDIS2 starts to discharge the capacitor 104, the supply voltage VCC is determined by the second discharge current IDIS2, the charge current IC, and the capacitor 104. In one embodiment of the present invention, the second discharge current IDIS2 is greater than the charge current IC, so the supply voltage VCC will start to be gradually reduced until the supply voltage VCC is less than a lower limit LLI (a time T4 shown in FIG. 6). As shown in FIG. 6, at the time T4, because the supply voltage VCC is less than the lower limit LLI, the current source 5022 generates a first discharge current IDIS1. Meanwhile, the supply voltage VCC is determined by the first discharge current IDIS1, the charge current IC, and the capacitor 104. In one embodiment of the present invention, the first discharge current IDIS1 is less than the charge current IC, so the supply voltage VCC will start to be gradually increased until the supply voltage VCC is greater than an upper limit ULI (a time T5 shown in FIG. 6). Thus, the delay circuit 502 can execute the above-mentioned operational principles corresponding to the time T4 and the time T5 repeatedly until a number (counted by the counter 5024) of the supply voltage VCC being less than the lower limit LLI (in another embodiment of the present invention, the counter 5024 counts a number of the supply voltage VCC being greater than the upper limit ULI) is equal to a predetermined number (corresponding to a time T6 of FIG. 6). At the time T6, because the number is equal to the predetermined number, the current source 5022 only generates the second discharge current IDIS2, resulting in after the time T6, the supply voltage VCC starting to be reduced until the supply voltage VCC is less than the under voltage lock out turning-off voltage UVLOOFF (a time T7 shown in FIG. 6). Therefore, although as shown in FIG. 6, the gate signal generation circuit can still generate the gate control signal GCS to the power switch 102 during the recovery period TR, but because the delay circuit 502 can utilize the above-mentioned operational principles shown in FIG. 6 to extend the predetermined delay time (that is, extending the protection period TP), the controller 500 can make the heat generated by the power switch 102 of the power converter 100 during the recovery period TR be effectively dissipated to protect the components within the television. In addition, subsequent operational principles of the controller 500 are the same as those of the controller 200, so further description thereof is omitted for simplicity.

Figure 7:
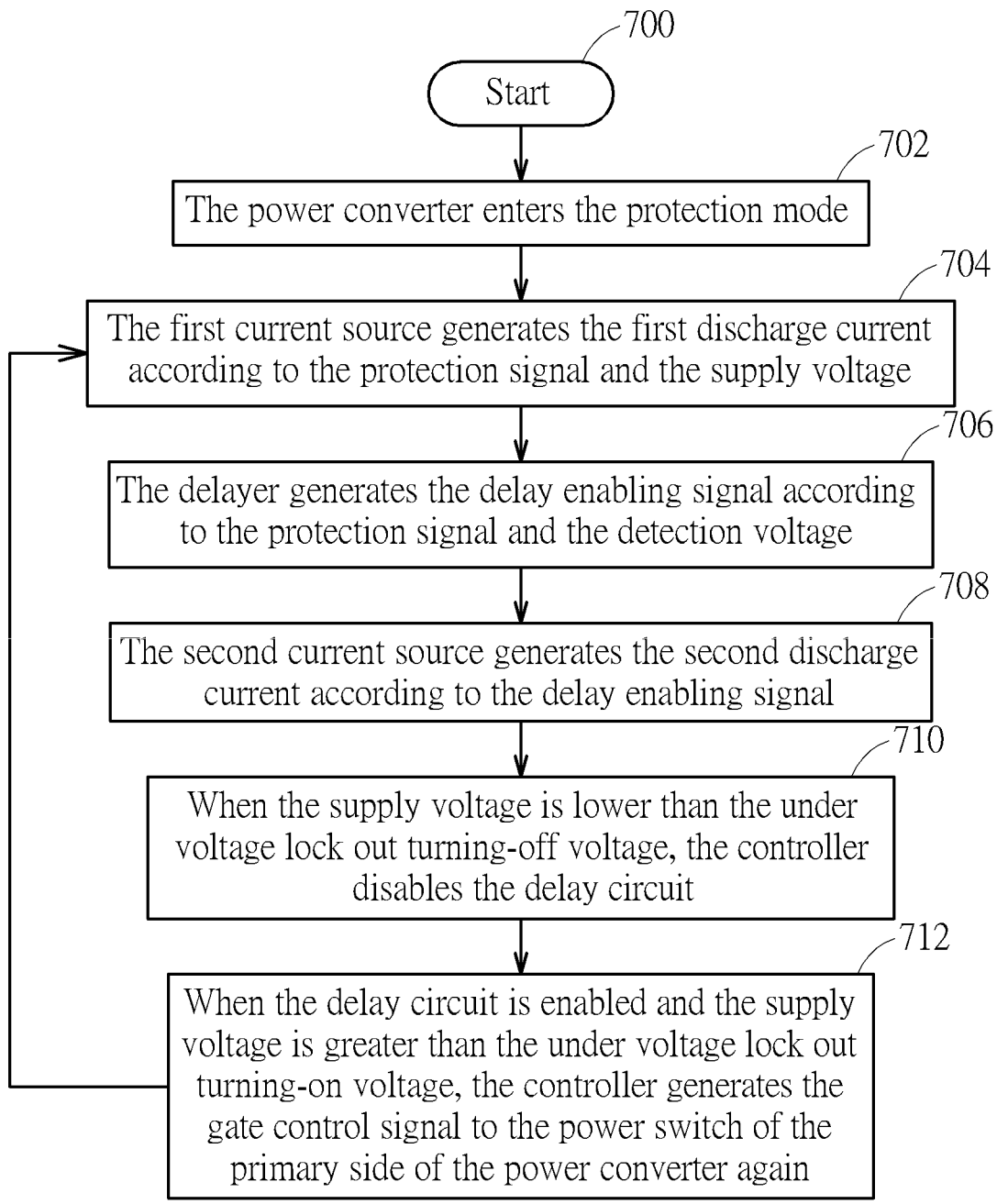
FIG. 7 is a flowchart illustrating an operational method of a controller extending a protection period of a power converter according to a third embodiment of the present invention.

Please refer to FIGS. 1, 2, 7. FIG. 7 is a flowchart illustrating an operational method of a controller extending a protection period of a power converter according to a third embodiment of the present invention. The operational method in FIG. 7 is illustrated using the power converter 100 and the controller 200 in FIG. 1. Detailed steps are as follows:

Step 700: Start.

Step 702: The power converter 100 enters the protection mode.

Step 704: The first current source 2022 generates the first discharge current IDIS1 according to the protection signal OCP and the supply voltage VCC.

Step 706: The delayer 2024 generates the delay enabling signal DES according to the protection signal OCP and the detection voltage VCS.

Step 708: The second current source 2026 generates the second discharge current IDIS2 according to the delay enabling signal DES.

Step 710: When the supply voltage VCC is lower than the under voltage lock out turning-off voltage UVLOOFF, the controller 200 disables the delay circuit 202.

Step 712: When the delay circuit 202 is enabled and the supply voltage VCC is greater than the under voltage lock out turning-on voltage UVLOON, the controller 200 generates the gate control signal GCS to the power switch 102 of the primary side PRI of the power converter 100 again, go to Step 704.

In Step 702, as shown in FIG. 1, the protection circuit (not shown in the controller 200 of FIG. 1) of the controller 200 can determine whether to make the power converter 100 enter the protection mode according to the output current IOUT of the secondary side SEC of the power converter 100. After the power converter 100 enters the protection mode, at the time T1, the supply voltage VCC is greater than the under voltage lock out turning-on voltage UVLOON, so the gate signal generation circuit of the controller 200 can generate the gate control signal GCS to the power switch 102 between the time T2 and the time T3, wherein the time interval between the time T2 and the time T3 is the recovery period TR of the power converter 100 corresponding to the protection mode. As shown in FIGS. 1, 2, during the recovery period TR, because only the charge current IC charges the capacitor 104, the supply voltage VCC is maintained at the first steady state. In Step 704, as shown in FIG. 2, at the time T3, the gate signal generation circuit can stop generating the gate control signal GCS to the power switch 102 according to the detection voltage VCS (as shown in FIG. 1) of the primary side PRI of the power converter 100 and the reference voltage VREF, and the protection circuit generates the protection signal OCP to the first current source 2022 and the delayer 2024. Therefore, the first current source 2022 is enabled and starts to generate the first discharge current IDIS1 according to the supply voltage VCC to discharge the capacitor 104, wherein the first discharge current IDIS1 is changed with the variation of the supply voltage VCC. After the time T3, the first discharge current IDIS1 starts to discharge the capacitor 104, so the supply voltage VCC is determined by the first discharge current IDIS1, the charge current IC, and the capacitor 104, wherein because the first discharge current IDIS1 is greater than the charge current IC at the time T3, the supply voltage VCC will start to be gradually reduced until the time T4 (because the first discharge current IDIS1 is changed with the variation of the supply voltage VCC, at the time T4, the first discharge current IDIS1 will be reduced to be equal to the charge current IC, resulting in after the time T4, the supply voltage VCC being maintained at the second steady state until the time T5). In Step 706, as shown in FIG. 2, at the time T5, the delayer 2024 can generate the delay enabling signal DES to the second current source 2026 according to the protection signal OCP and the detection voltage VCS, so the second current source 2026 is enabled and starts to generate the second discharge current IDIS2 to discharge the capacitor 104, wherein the delay enabling signal DES corresponds to the predetermined delay time, and the time interval between the time T3 and the time T5 is the protection period TP of the power converter 100 corresponding to the protection mode. In Step 708, as shown in FIG. 2, after the time T5, the second discharge current IDIS2 starts to discharge the capacitor 104 (wherein the first discharge current IDIS1 still continuously discharges the capacitor 104, so the supply voltage VCC is determined by the first discharge current IDIS1, the second discharge current IDIS2, the charge current IC, and the capacitor 104), resulting in after the time T5, the supply voltage VCC starting to be reduced from the second steady state until less than the under voltage lock out turning-off voltage UVLOOFF (the time T6 shown in FIG. 2). In Step 710, as shown in FIG. 2, at the time T6, because the supply voltage VCC is lower than the under voltage lock out turning-off voltage UVLOOFF, the controller 200 disables the delay circuit 2024, resulting in the supply voltage VCC starting to be gradually increased until greater than the under voltage lock out turning-on voltage UVLOON (the time T7 shown in FIG. 2). In Step 712, as shown in FIG. 2, at the time T7, the supply voltage VCC is greater than the under voltage lock out turning-on voltage UVLOON, so the gate signal generation circuit (not shown in the controller 200 of FIG. 1) of the controller 200 generates the gate control signal GCS to the power switch 102 of the primary side PRI of the of the power converter 100 again.

Figure 8:
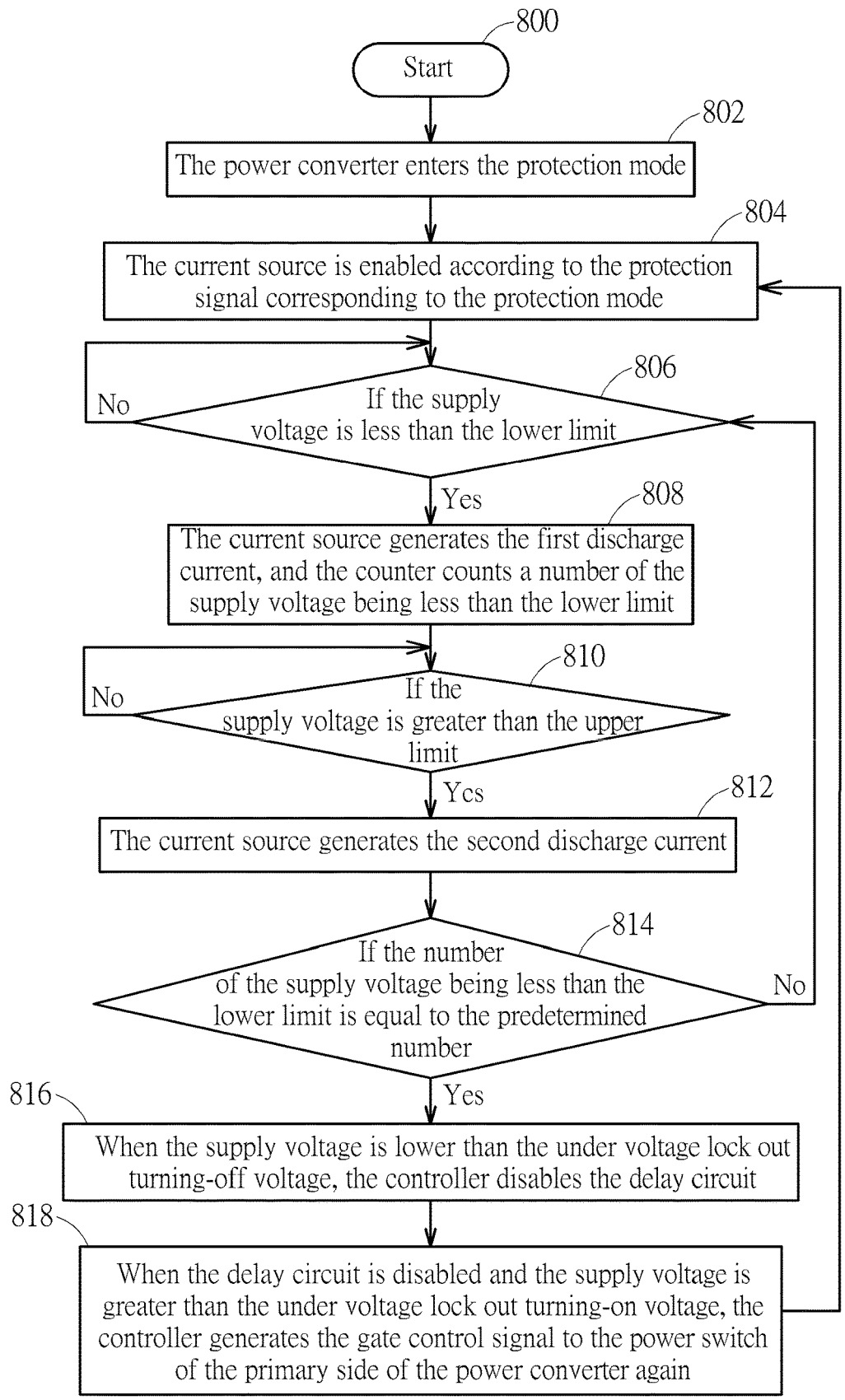
FIG. 8 is a flowchart illustrating an operational method of a controller extending a protection period of a power converter according to a fourth embodiment of the present invention.

Please refer to FIGS. 1, 5, 6, 8. FIG. 8 is a flowchart illustrating an operational method of a controller extending a protection period of a power converter according to a fourth embodiment of the present invention. The operational method in FIG. 8 is illustrated using the power converter 100 and the controller 500 in FIG. 5. Detailed steps are as follows:

Step 800: Start.

Step 802: The power converter 100 enters the protection mode.

Step 804: The current source 5022 is enabled according to the protection signal OCP corresponding to the protection mode.

Step 806: If the supply voltage VCC is less than the lower limit LLI; if yes, go to Step 808; if no, go to Step 806 again.

Step 808: The current source 5022 generates the first discharge current IDIS1, and the counter 5024 counts a number of the supply voltage VCC being less than the lower limit LLI.

Step 810: If the supply voltage VCC is greater than the upper limit ULI; if yes, go to Step 812; if no, go to Step 810 again.

Step 812: The current source 5022 generates the second discharge current IDIS2.

Step 814: If the number of the supply voltage VCC being less than the lower limit LLI is equal to the predetermined number; if yes, go to Step 816; if no, go to Step 806.

Step 816: When the supply voltage VCC is lower than the under voltage lock out turning-off voltage UVLOOFF, the controller 500 disables the delay circuit 502.

Step 818: When the delay circuit 502 is disabled and the supply voltage VCC is greater than the under voltage lock out turning-on voltage UVLOON, the controller 500 generates the gate control signal GCS to the power switch 102 of the primary side PRI of the power converter 100 again, go to Step 804.

Differences between the fourth embodiment of FIG. 8 and the third embodiment of FIG. 7 are that in Step 806, at the time T3, the current source 5022 is enabled and starts to generate the second discharge current IDIS2 to discharge the capacitor 104 (as shown in FIG. 5), so the supply voltage VCC will start to be gradually reduced until the supply voltage VCC is less than the lower limit LLI (the time T4 shown in FIG. 6); in Step 808, as shown in FIG. 6, at the time T4, because the current source 5022 generates the first discharge current IDIS1, the supply voltage VCC will start to be gradually increased until the supply voltage VCC is greater than the upper limit ULI (the time T5 shown in FIG. 6); in Step 812, because the current source 5022 generates the second discharge current IDIS2, the supply voltage VCC will start to be gradually reduced until the supply voltage VCC is less than the less than the lower limit LLI; in Step 814, the delay circuit 502 can execute the above-mentioned operational principles corresponding to the time T4 and the time T5 repeatedly until the number of the supply voltage VCC being less than the lower limit LLI (in another embodiment of the present invention, the counter 5024 counts the number of the supply voltage VCC being greater than the upper limit ULI) is equal to the predetermined number (corresponding to the time T6 of FIG. 6); at the time T6, because the number of the supply voltage VCC being less than the lower limit LLI is equal to the predetermined number, the current source 5022 only generates the second discharge current IDIS2, resulting in after the time T6, the supply voltage VCC starting to be reduced until the supply voltage VCC is less than the under voltage lock out turning-off voltage UVLOOFF (the time T7 shown in FIG. 6). In addition, subsequent operational principles of the fourth embodiment of FIG. 8 are the same as those of the third embodiment of FIG. 7, so further description thereof is omitted for simplicity.

To sum up, the controller and the operational method utilize the delay circuit to extend the protection period corresponding to the protection mode according to the supply voltage after the power converter enters the protection mode. In addition, the above-mentioned embodiments take the protection signal applied to the over current protection and the output short-circuited protection as examples. In fact, the protection signal of the present invention can also be applied to various protection mechanisms or various protection modes. For example, the protection signal of the present invention can be applied to over voltage protection (OVP), over load protection (OLP), over temperature protection (OTP), brown out protection, and so on. Therefore, because the present invention can extend the protection period, compared to the prior art, the present invention can make the heat generated by the power switch of the power converter during the recovery period corresponding to the protection mode be effectively dissipated. In addition, because the controller controls the supply voltage directly through the supply voltage pin, the controller does not need any additional pin.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for extending a protection period of a power converter, comprising:
    a delay circuit coupled to a supply voltage pin of the controller, wherein when the power converter enters a protection mode, the delay circuit is enabled, receives a supply voltage through the supply voltage pin, and extends the protection period corresponding to the protection mode according to the supply voltage, and the delay circuit comprises:
        a first current source coupled to the supply voltage pin for generating a first discharge current according to a protection signal corresponding to the protection mode and the supply voltage when the power converter enters the protection mode;
        a delayer for generating a delay enabling signal according to the protection signal and a detection voltage of a primary side of the power converter, wherein the delay enabling signal corresponds to a predetermined delay time; and
        a second current source coupled to the delayer and the supply voltage pin for generating a second discharge current according to the delay enabling signal;
        wherein the supply voltage is determined by the first discharge current, a capacitor of the primary side of the power converter, and a charge current corresponding to an input terminal of the primary side of the power converter, or determined by the first discharge current, the second discharge current, the capacitor, and the charge current.

2. The controller of claim 1, wherein when the supply voltage is lower than an under voltage lock out turning-off voltage, the controller disables the delay circuit.

3. The controller of claim 2, wherein when the delay circuit is disabled and the supply voltage is greater than an under voltage lock out turning-on voltage, the controller generates a gate control signal to a power switch of the primary side of the power converter again.

4. The controller of claim 1, wherein the second discharge current is adjusted according to an output voltage of a secondary side of the power converter.

5. The controller of claim 1, wherein the delay circuit comprises:
    the first current source being enabled according to the protection signal corresponding to the protection mode, generating the first discharge current when the supply voltage is less than a lower limit, and generating the second discharge current when the supply voltage is greater than an upper limit; and
    a counter for counting a number of the supply voltage being less than the lower limit;
    wherein the supply voltage is determined by the first discharge current, a capacitor of the primary side of the power converter, and the charge current corresponding to the input terminal of the primary side of the power converter, or determined by the second discharge current, the capacitor, and the charge current;
wherein when the number is equal to a predetermined number, the counter makes the second current source generate the second discharge current, the first discharge current is less than the charge current, and the second discharge current is greater than the charge current.

6. The controller of claim 5, wherein when the supply voltage is lower than an under voltage lock out turning-off voltage, the controller disables the delay circuit.

7. The controller of claim 6, wherein when the delay circuit is disabled and the supply voltage is greater than an under voltage lock out turning-on voltage, the controller generates a gate control signal to a power switch of the primary side of the power converter.

8. The controller of claim 5, wherein the second discharge current is adjusted according to an output voltage of a secondary side of the power converter.

9. The controller of claim 1, wherein the protection mode corresponds to output short-circuited protection (OSCP) or over current protection (OCP).

10. The controller of claim 1, wherein the protection mode further corresponds to over voltage protection (OVP), over load protection (OLP), over temperature protection (OTP), or brown out protection.

11. The controller of claim 1, wherein the power converter is a flyback power converter.

12. An operational method of a controller extending a protection period of a power converter, wherein the controller comprises a delay circuit, and the delay circuit comprises a first current source, a delayer, and a second current source, the operational method comprising:
the power converter entering a protection mode;
the first current source generating a first discharge current according to a protection signal corresponding to the protection mode and a supply voltage, and the supply voltage being determined by the first discharge current, a capacitor of a primary side of the power converter, and a charge current corresponding to an input terminal of the primary side of the power converter;
the delayer generating a delay enabling signal according to the protection signal and a detection voltage of the primary side of the power converter, wherein the delay enabling signal corresponds to a predetermined delay time; and
the second current source generating a second discharge current according to the delay enabling signal, and the supply voltage being determined by the second discharge current, and the first discharge current, the capacitor, and the charge current.

13. The operational method of claim 12, further comprising: the controller disabling the delay circuit when the supply voltage is lower than an under voltage lock out turning-off voltage; and
the controller generating a gate control signal to a power switch of the primary side of the power converter when the delay circuit is disabled and the supply voltage is greater than an under voltage lock out turning-on voltage.

14. The operational method of claim 12, wherein the second discharge current is adjusted according to an output voltage of a secondary side of the power converter.

15. An operational method of a controller extending a protection period of a power converter, wherein the controller comprises a delay circuit, and the delay circuit comprises a current source and a counter, the operational method comprising:
the power converter entering a protection mode;
the current source being enabled according to a protection signal corresponding to the protection mode;
the current source generating a first discharge current when a supply voltage is less than a lower limit, and the supply voltage being determined by the first discharge current, a capacitor of a primary side of the power converter, and a charge current corresponding to an input terminal of the primary side of the power converter;
the current source generating a second discharge current when the supply voltage is greater than an upper limit, and the supply voltage being determined by the second discharge current, the capacitor, and the charge current; and
the counter making the current source generate the second discharge current when a number of the supply voltage being less than the lower limit counted by the counter is equal to a predetermined number;
wherein the first discharge current is less than the charge current, and the second discharge current is greater than the charge current.

16. The operational method of claim 15, further comprising:
the controller disabling the delay circuit when the supply voltage is lower than an under voltage lock out turning-off voltage; and
the controller generating a gate control signal to a power switch of the primary side of the power converter when the delay circuit is disabled and the supply voltage is greater than an under voltage lock out turning-on voltage.

17. The operational method of claim 15, wherein the second discharge current is adjusted according to an output voltage of a secondary side of the power converter.

* * * * *